(12) United States Patent
Park (10) Patent No.: US 12,539,654 B2
(45) Date of Patent: Feb. 3, 2026

(54) APPARATUS AND METHOD FOR MANUFACTURING PIPE

(71) Applicant: SEMES CO., LTD., Chungcheongnam-do (KR)

(72) Inventor: Chul Jin Park, Chungcheongnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 56 days.

(21) Appl. No.: 18/191,961

(22) Filed: Mar. 29, 2023

(65) Prior Publication Data

US 2024/0217151 A1 Jul. 4, 2024

(30) Foreign Application Priority Data

Dec. 28, 2022 (KR) ........................ 10-2022-0187848

(51) Int. Cl.
*B29C 45/26* (2006.01)
*B29L 23/00* (2006.01)

(52) U.S. Cl.
CPC ........ *B29C 45/261* (2013.01); *B29C 45/2673* (2013.01); *B29L 2023/22* (2013.01)

(58) Field of Classification Search
None
See application file for complete search history.

(56) References Cited

U.S. PATENT DOCUMENTS

| 2010/0247701 | A1* | 9/2010 | Sorimoto | ........... B22D 17/2236 425/236 |
| 2017/0297230 | A1* | 10/2017 | Sorimoto | ............ B29C 45/4471 |

FOREIGN PATENT DOCUMENTS

| JP | 2005-035247 A | 2/2005 |
| KR | 10-1999-0067554 A | 8/1999 |
| KR | 10-2010-0115239 A | 10/2010 |
| KR | 10-2011-0023230 A | 3/2011 |
| KR | 10-2012-0034358 A | 4/2012 |
| KR | 10-1471325 B1 | 12/2014 |
| WO | 97/18076 A1 | 5/1997 |

OTHER PUBLICATIONS

Machine translation KR 10-147325.*
Korean Office Action issued in corresponding KR Patent Application No. 10-2022-0187848, dated Dec. 9, 2025, with English translation.

* cited by examiner

*Primary Examiner* — Christopher T Schatz
(74) *Attorney, Agent, or Firm* — Carter, DeLuca & Farrell LLP (57) ABSTRACT

An apparatus for manufacturing a pipe includes a mold portion having an inner surface corresponding to an outer shape of the pipe, and a core portion having an outer surface corresponding to an inner shape of the pipe, wherein the mold portion includes an upper mold, a plurality of side molds, and a lower mold, and the core portion includes a plurality of corner cores corresponding to an inner corner of the pipe, and a plurality of side cores disposed between the plurality of corner cores and corresponding to an inner side surface of the pipe, wherein the lower mold is supported to move the plurality of side molds, is installed to slide the plurality of side cores, and is configured to move in a first direction to move the plurality of side molds and the plurality of side cores in a second direction, perpendicular to the first direction.

14 Claims, 10 Drawing Sheets

APPARATUS AND METHOD FOR MANUFACTURING PIPE

CROSS-REFERENCE TO RELATED APPLICATION(S)

This application claims benefit of priority to Korean Patent Application No. 10-2022-0187848 filed on Dec. 28, 2022 in the Korean Intellectual Property Office, the disclosure of which is incorporated herein by reference in its entirety.

BACKGROUND

1. Field

The present disclosure relates to an apparatus and method for manufacturing a pipe in which a corrugation is formed.

2. Description of Related Art

In general, in various fields such as semiconductor manufacturing, air conditioning systems, or the like, a fluid flow line such as a flow pipe through which gas or the like flows, a supply pipe through which gas or the like is supplied, an exhaust pipe through which gas or the like is discharged, or the like may be provided. The fluid flow line may be configured to connect a plurality of connection pipes. For example, in an exhaust device applied to a semiconductor manufacturing process, a flexible pipe, such as a corrugated pipe, may be freely disposed in a limited space to have an appropriate position, as needed, in order to process gas or implement smooth flow thereof. Such a flexible pipe may be manufactured using various types of molding mechanisms.

For example, in Korean Patent Registration No. 10-1471325, a flexible rectangular duct connector is manufactured by molding using a mold including a core assembly including a square bar-shaped central core extending in a direction, parallel to a longitudinal direction, a central core surrounding four corners of the central core, parallel to the longitudinal direction, an upper core and a lower core, arranged such that one surfaces thereof are in contact with upper and lower surfaces of the central core, respectively, and a pair of side cores arranged such that one surfaces thereof are in contact with both side surfaces of the central core, respectively; a pair of outer molds in which the core assembly is accommodated; a first end mold covering one side of the pair of outer molds and having a core insertion hole through which the core assembly passes; and a second end mold covering the other side of the pair of outer molds, to prepare the flexible duct connector. In this mold, as a structure in which the core assembly is divided into nine (9) portions, when the flexible duct connector is removed, the outer mold may be separated, the central core of the core assembly may be removed of the mold, and the upper core, the lower core, the pair of side cores, and the corner core of the core assembly may be manually disassembled by an operator sequentially, to remove the flexible duct connector, and also a cumbersome work of reassembling for a later process should be performed. For this reason, there may be problems in that a lot of working time period is required for disassembling and assembling the mold and workability for removing the flexible duct connector is low.

SUMMARY

The present disclosure has been devised to solve the above problems, and an object of the present disclosure is to provide an apparatus and method for manufacturing a pipe that shortens a working time period and improves workability in removing a corrugated pipe.

According to an aspect of the present disclosure, an apparatus for manufacturing a pipe includes a mold portion having an inner surface corresponding to an outer shape of the pipe, and a core portion having an outer surface corresponding to an inner shape of the pipe, wherein the mold portion includes an upper mold, a plurality of side molds, and a lower mold, and the core portion includes a plurality of corner cores corresponding to an inner corner of the pipe, and a plurality of side cores disposed between the plurality of corner cores and corresponding to an inner side surface of the pipe, wherein the lower mold is supported to move the plurality of side molds, is installed to slide the plurality of side cores, and is configured to move in a first direction to move the plurality of side molds and the plurality of side cores in a second direction, perpendicular to the first direction.

The present disclosure may further include a base member spaced apart from the mold portion and the core portion in the first direction, wherein each of the plurality of side cores may include a side head corresponding to the inner side surface of the pipe; and a head extension bar extending from the side head in the first direction and hinged to the base member to rotate and move in the second direction.

The lower mold may include a support moving in the first direction, and installed to move the plurality of side molds in the second direction; a support mold installed on the support, and having a plurality of through-holes through which a plurality of the head extension bar of the plurality of side cores pass and slide; and a core support member installed on the support mold and supporting inner side surfaces of the plurality of side cores.

The plurality of through-holes may be formed to be inclined inwardly toward the upper mold.

The side head of each of the plurality of side cores may be formed to be thicker toward the upper mold.

The core support member may be formed to be tapered toward the upper mold.

A guide rail may be installed on the support, and a guide groove corresponding to the guide rail may be formed on each of the plurality of side molds to slide each of the plurality of side molds along the guide rail.

The present disclosure may further include a roof member moving in the first direction and having the upper mold installed thereon, wherein a plurality of inclined bars inclined outwardly toward the plurality of side molds may be formed on the roof member, a plurality of inclined holes through which the plurality of inclined bars pass and slide, may be formed on each of the plurality of side molds, and the plurality of inclined holes may be formed to be inclined to correspond to the plurality of inclined bars.

Each of the plurality of corner cores may include a corner head corresponding to the inner corner of the pipe; and a head pillar detachably installed on the corner head in the first direction and fixed to the base member.

A mold corrugation surface may be formed on the plurality of side molds to correspond to a corrugation of the pipe, and a core corrugation surface may be formed on the plurality of corner cores and the plurality of side cores, respectively.

According to an aspect of the present disclosure, an apparatus for manufacturing a pipe, includes an upper mold, a side mold, and a lower mold, having an inner surface corresponding to an outer shape of the pipe, a plurality of corner cores corresponding to an inner corner of the pipe, a plurality of side cores disposed between the plurality of corner cores and corresponding to an inner side surface of the pipe, and a base member spaced apart from the lower mold in a first direction, wherein each of the plurality of side cores includes a side head corresponding to the inner side surface of the pipe, and a head extension bar extending from the side head in the first direction and hinged to the base member, the lower mold includes a support installed to move in the first direction and to move the side mold in a second direction, perpendicular to the first direction, a support mold installed on the support, and having a plurality of through-holes through which a plurality of the head extension bar of the plurality of side cores pass and slide, and a core support member installed on the support mold and slidably supporting inner side surfaces of the plurality of side cores, wherein the plurality of through-holes are formed to be inclined inwardly toward the upper mold, and a portion of the side head of the side core is formed to be thicker toward the upper mold.

According to an aspect of the present disclosure, a method for manufacturing a pipe, includes an assembly operation of assembling a mold portion including an upper mold, a side mold, and a lower mold, having an inner surface corresponding to an outer shape of the pipe, and a core portion including a plurality of corner cores corresponding to an inner corner of the pipe, a plurality of side cores disposed between the plurality of corner cores and corresponding to an inner side surface of the pipe; a molding operation of molding the pipe by injecting a material between the mold portion and the core portion; and a disassembly operation of moving the lower mold in a first direction to separate the upper mold and the plurality of corner cores from the pipe in a second direction, perpendicular to the first direction, and separating the side mold and the plurality of side cores from the pipe.

The disassembly operation may include a lower mold moving operation of moving the lower mold in the first direction, rotating and moving the plurality of side cores hinged to a base member in the second direction, and moving the side mold in the second direction; an upper mold moving operation of moving the upper mold in the first direction; and a corner core moving operation of proceeding after the lower mold moving operation and moving the plurality of corner cores in the first direction.

The lower mold may include a support installed to move in the first direction and to move the side mold in the second direction, a support mold installed on the support and having a plurality of through-holes through which the plurality of side cores pass and slide, and a core support member installed on the support mold and slidably supporting inner side surfaces of the plurality of side cores, wherein the plurality of through-holes are formed to be inclined inwardly toward the upper mold, and in the lower mold moving operation, the support mold and the core support member move in the first direction, by movement of the support in the first direction, such that the plurality of side cores are pushed against inclined inner surfaces of the plurality of through-holes to rotate and move in the second direction.

A plurality of inclined bars inclined outwardly toward the side mold may be formed on a roof member in which the upper mold is installed, a plurality of inclined holes through which the plurality of inclined bars pass and slide may be formed on the side mold, and the plurality of inclined holes are formed to be inclined to correspond to the plurality of inclined bars, and in the lower mold moving operation, inner surfaces of the plurality of inclined holes may be pushed against outer surfaces of the plurality of inclined bars, by movement of the support in the first direction, to move in the second direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, a preferred embodiment will be described in detail such that those skilled in the art may easily practice the present disclosure with reference to the accompanying drawings. However, in describing a preferred embodiment of the present disclosure in detail, when it is determined that a detailed description of a related known function or configuration may unnecessarily obscure the gist of the present disclosure, the detailed description will be omitted. In addition, the same reference numerals may be used throughout the drawings for portions having similar functions and actions. In addition, in the present specification, terms such as 'on,' 'upper portion,' 'upper surface,' 'below,' 'lower portion,' 'lower surface,' 'side surface,' and the like may be based on the drawings, and components may be actually changed, depending on a direction in which the components are disposed.

In addition, throughout the specification, when a portion is 'connected' to another portion, it may be not only 'directly connected', but also 'indirectly connected' to other components therebetween. In addition, 'including' a certain component means that other components may be further included, rather than excluding other components, unless otherwise stated.

Figure 1:
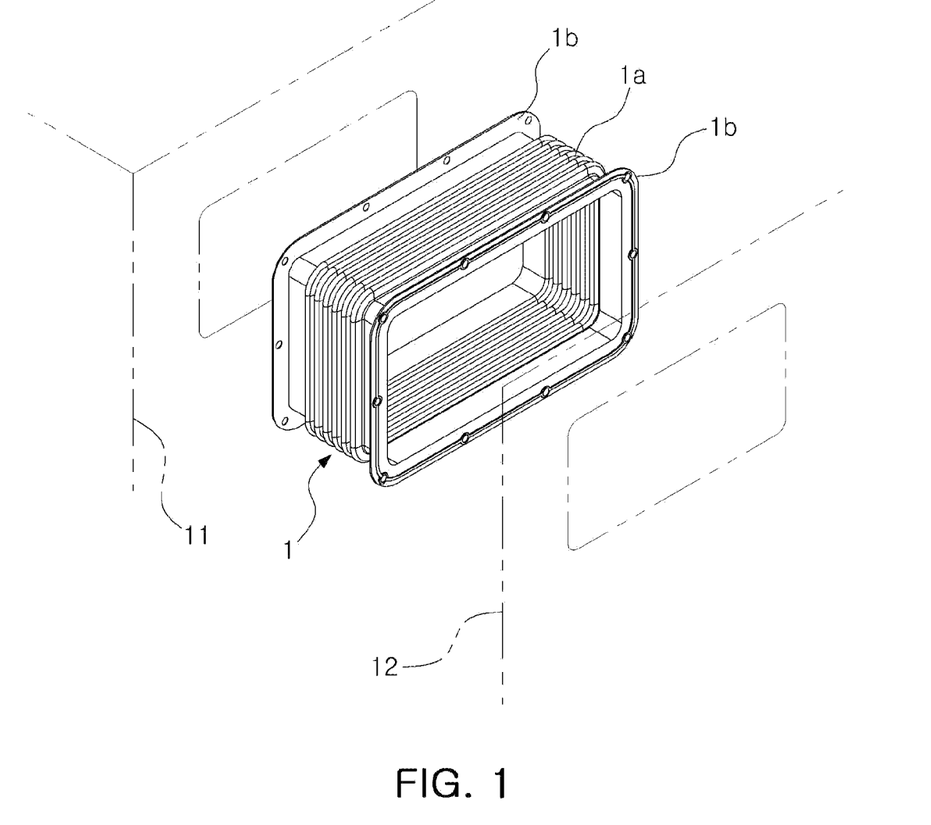
FIG. 1 is a view illustrating a corrugated pipe.

FIG. 1 is a view illustrating a corrugated pipe.

Referring to the drawing, a pipe 1 may connect two (2) devices 11 and 12, and may be formed to correspond to a square cross-sectional outlet or inlet of the two (2) devices 11 and 12.

The pipe 1 may include a body 1a and a flange 1b. The body 1a may be formed to have a square or rectangular cross-section, may have a flexible shape that is variable in length, and may have a corrugation as a whole for this purpose. In addition, flanges 1*b* may be integrally formed on both ends of the body 1*a*.

Figure 2:
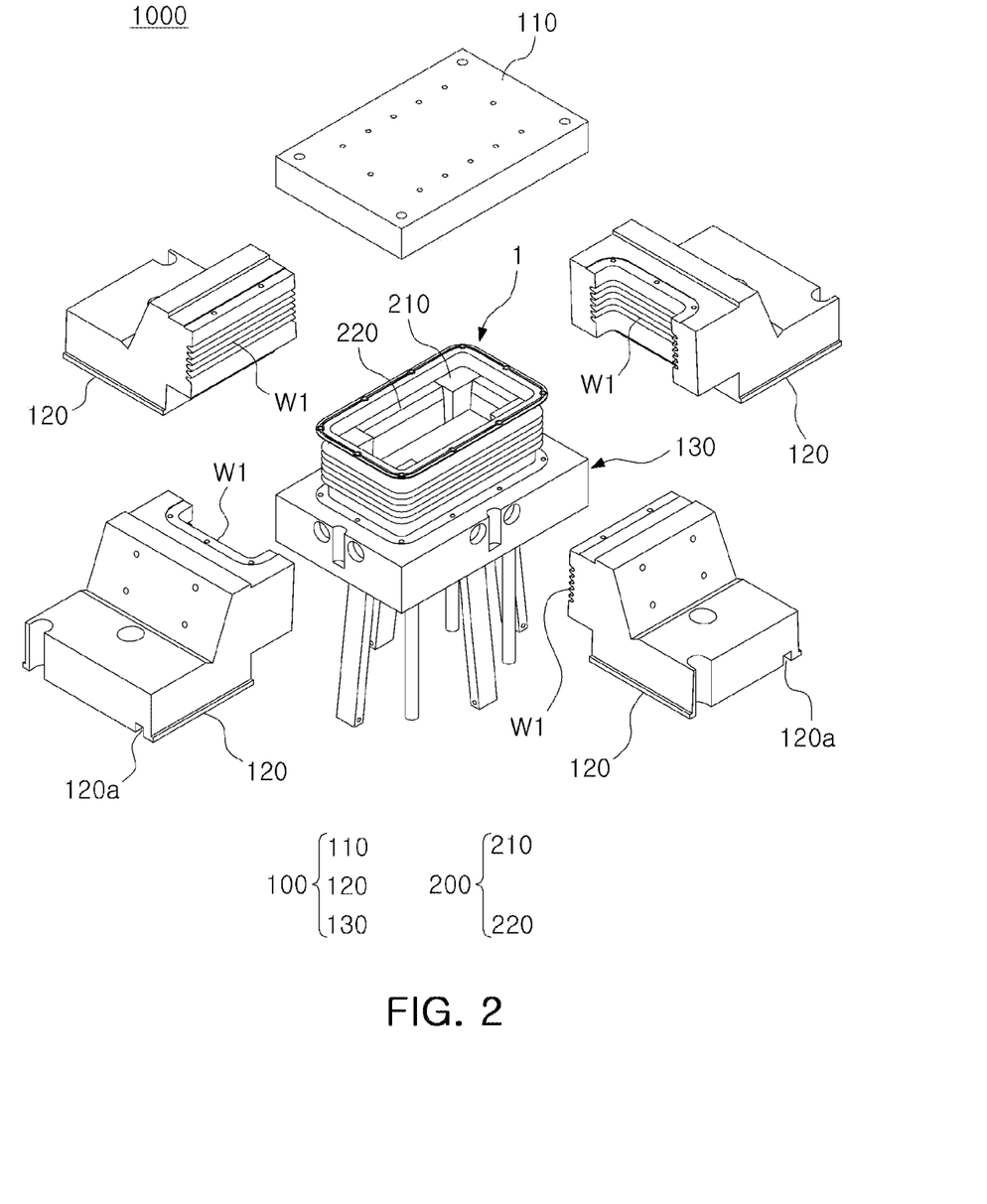
FIG. 2 is an exploded perspective view illustrating that a mold portion and a core portion are disassembled from an apparatus for manufacturing a pipe according to the present disclosure.
Figure 3:
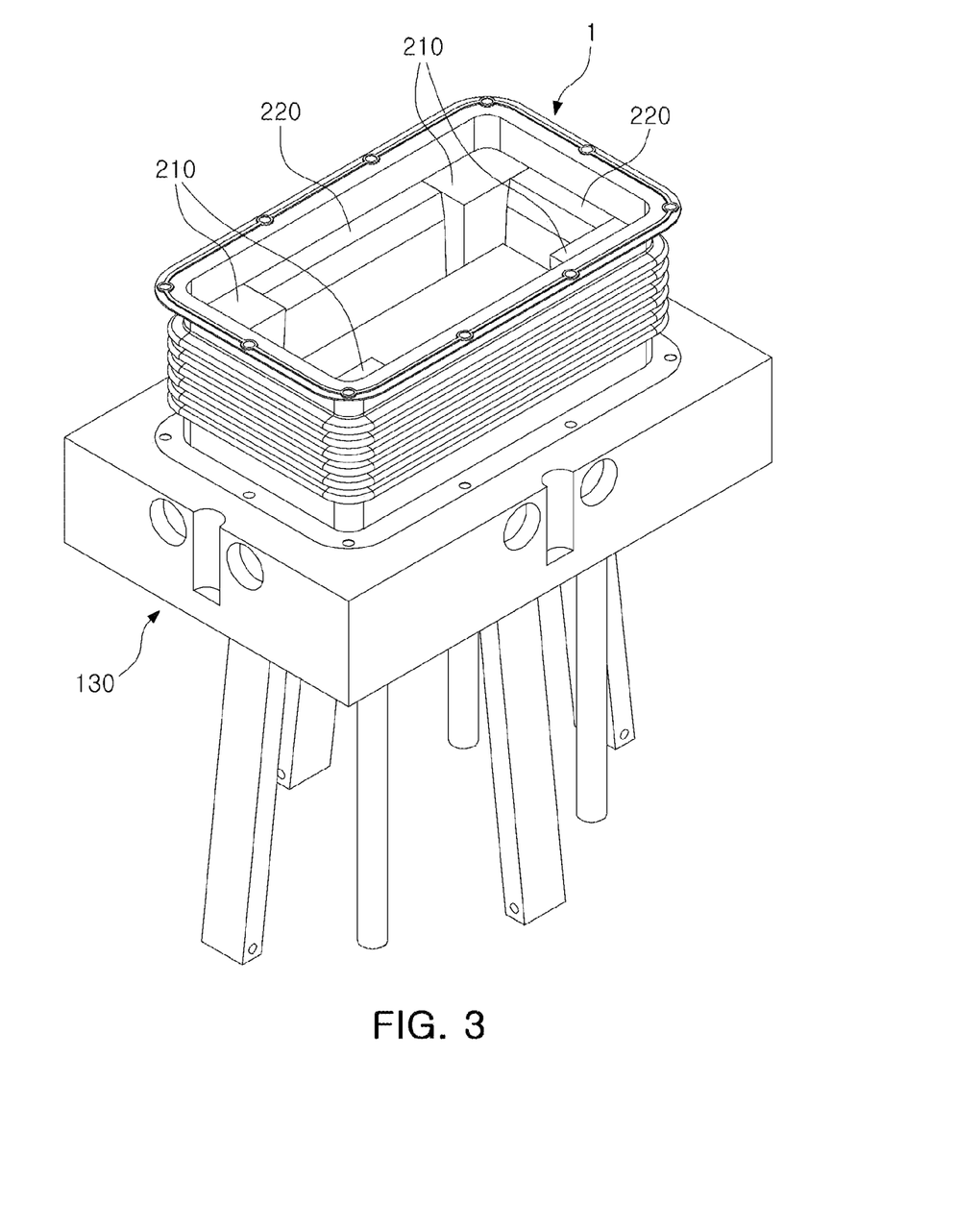
FIG. 3 is a view illustrating the lower mold in the mold portion of FIG. 2.

FIG. 2 is an exploded perspective view illustrating that a mold portion and a core portion are disassembled from an apparatus for manufacturing a pipe according to the present disclosure, and FIG. 3 is a view illustrating the lower mold in the mold portion of FIG. 2.

Referring to the drawings, an apparatus 1000 for manufacturing a pipe of the present disclosure may include a mold portion 100 and a core portion 200.

In this case, the mold portion 100 may have an inner surface corresponding to an outer shape of the pipe 1.

Specifically, the mold portion 100 may include an upper mold 110, a side mold 120, and a lower mold 130.

The upper mold 110 may be installed on a roof member 900 in an upper portion, and the side mold 120 may be installed on the lower mold 130. The side mold 120 may be provided as a plurality of side molds 120, and each of the plurality of side molds 120 may have a mold corrugation surface W1 corresponding to the outer shape of the pipe 1.

The core portion 200 may have an outer surface corresponding to an inner shape of the pipe 1.

Specifically, the core portion 200 may include a corner core 210 and a side core 220.

The corner core 210 and the side core 220 may be installed on a base member 800 in a lower portion.

The corner core 210 and the side core 220 may be provided as a plurality of corner cores 210 and a plurality of side cores 220, respectively, and the side core 220 may be disposed between the plurality of corner cores 210.

Each of the plurality of corner cores 210 and each of the plurality of side cores 220 may have a core corrugation surface W2 (in FIG. 10) corresponding to the inner shape of the pipe 1.

Figure 4:
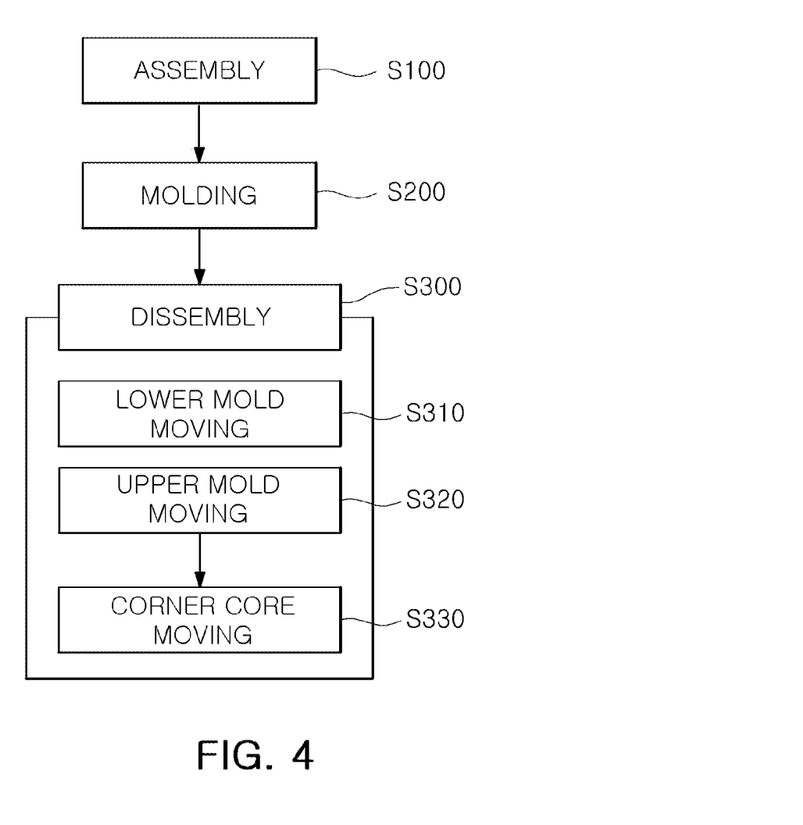
FIG. 4 is a flow chart illustrating a method for manufacturing a pipe according to the present disclosure.
Figure 5:
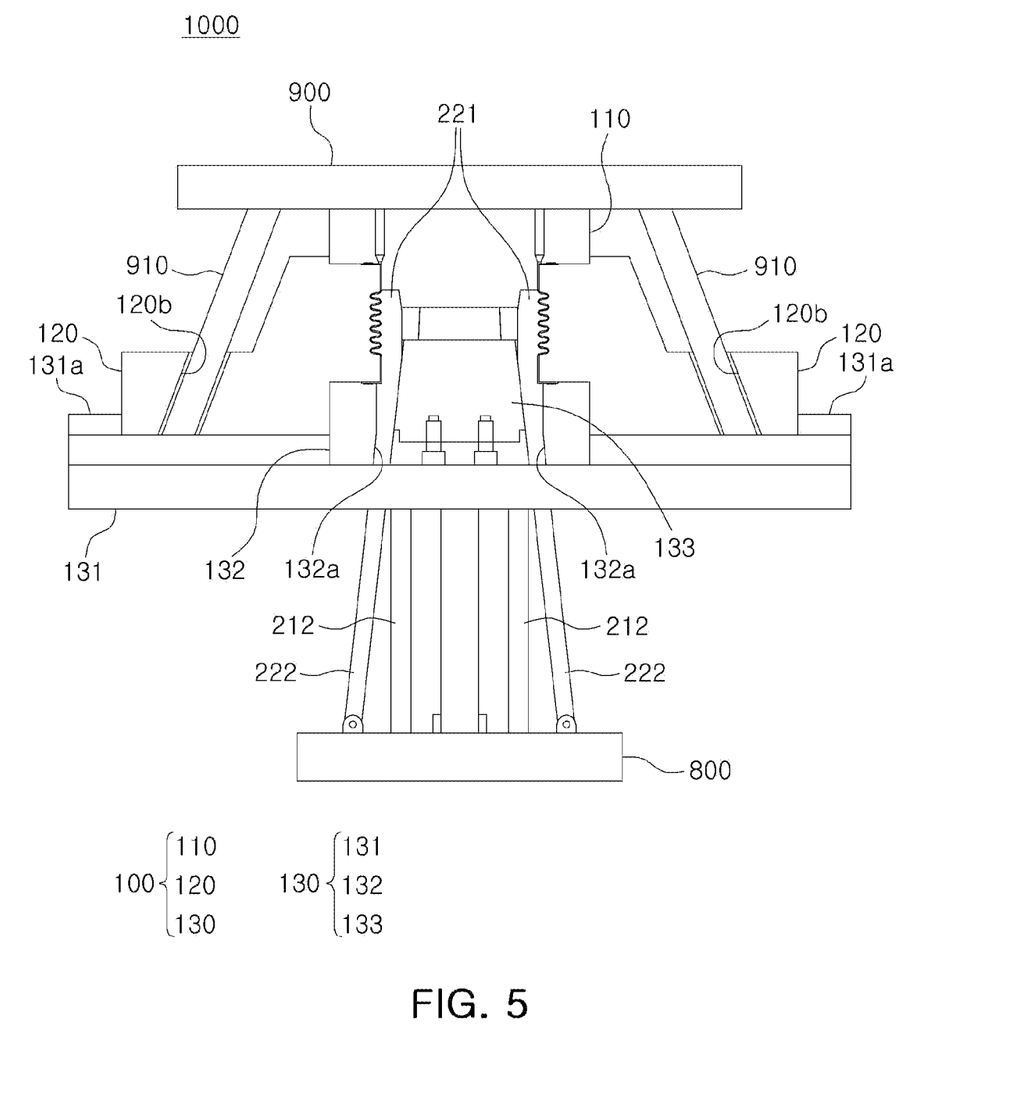
FIG. 5 is a cross-sectional view illustrating that the mold portion and the core portion are assembled in the apparatus, in FIG. 2.
Figure 6:
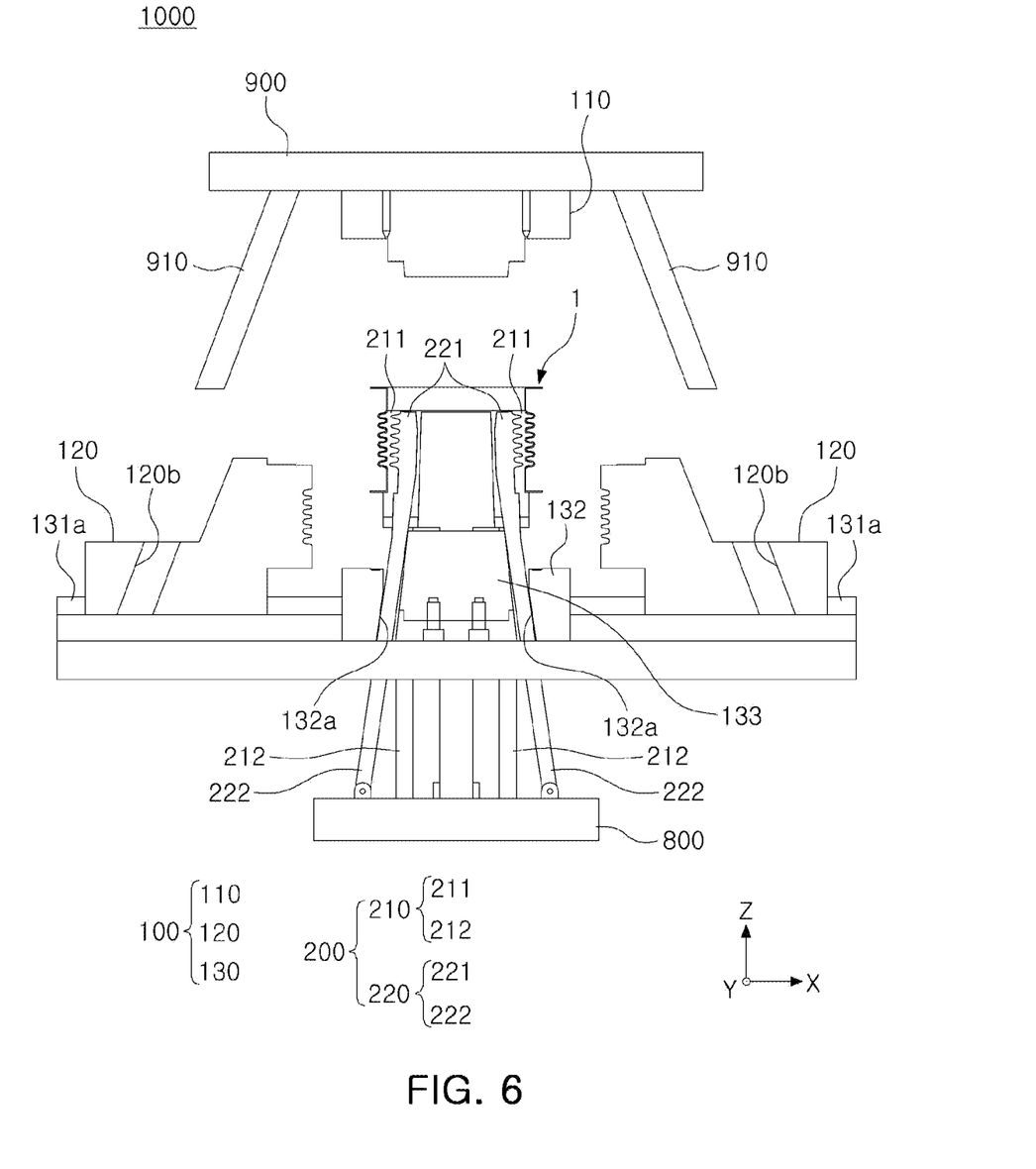
FIG. 6 is a cross-sectional view illustrating that, after the pipe is manufactured between the mold portion and the core portion, the lower mold of the mold portion is lowered and the upper mold is raised, in FIG. 2.

FIG. 4 is a flow chart illustrating a method for manufacturing a pipe according to the present disclosure, FIG. 5 is a cross-sectional view illustrating that the mold portion and the core portion are assembled in the apparatus, in FIG. 2, and FIG. 6 is a cross-sectional view illustrating that, after the pipe is manufactured between the mold portion and the core portion, the lower mold of the mold portion is lowered and the upper mold is raised, in FIG. 2.

Referring to the drawings, a method for manufacturing a pipe according to the present disclosure may include an assembly operation (S100), a molding operation (S200), and a disassembly operation (S300).

The assembly operation (S100) may be an operation of assembling a mold portion 100 and a core portion 200. For example, in the assembly operation (S100), the mold portion 100 including an upper mold 110, a side mold 120, and a lower mold 130, and the core portion 200 including a plurality of corner cores 210 and a plurality of side cores 220 may be assembled.

Next, the molding operation (S200) may be an operation of molding the pipe 1 by injecting a material between the mold portion 100 and the core portion 200. For example, in the molding operation (S200), a pipe 1 in which a corrugation is formed may be molded by injecting a molten material into a gap between the mold portion 100 and the core portion 200.

Finally, the disassembly operation (S300) may be an operation of separating the mold portion 100 and the core portion 200 from the pipe 1. First, the lower mold 130 may move in a first direction (Z) to move the side mold 120 and the plurality of side cores 220 in a second direction (X or Y), perpendicular to the first direction (Z). In this case, in the drawings, the first direction (Z) may be a vertical direction (upward and downward directions), and the second direction (X or Y) may be a horizontal direction. Then, the upper mold 110 and the plurality of corner cores 210 may be separated from the pipe 1.

Specifically, the disassembly operation (S300) may include a lower mold moving operation (S310), an upper mold moving operation (S320), and a corner core moving operation (S330).

The lower mold moving operation (S310) may be an operation of moving the lower mold 130, to rotate and move the plurality of side cores 220 and to move the side mold 120 in conjunction therewith. Specifically, in the lower mold moving operation (S310), the lower mold 130 may move in the first direction (Z), and may rotate and move the plurality of side cores 220 hinged to a base member 800 in the second direction (X or Y). For example, as the lower mold 130 moves downward in the drawings, the plurality of side cores 220 may rotate and move toward a center of the pipe 1 to be spaced apart from the pipe 1. More specifically, in the lower mold moving operation (S310), a support mold 132 and a core support member 133 may move in the first direction (Z) (downward direction on the drawings) by movement of a support 131 in the first direction (Z), such that the plurality of side cores 220 may be pushed against an inner surface of an inclined through-hole 132*a* to rotate and move in the second direction (X or Y). Also, in the lower mold moving operation (S310), the side mold 120 may move in the second direction (X or Y) by movement of the lower mold 130 in the first direction (Z). For example, as the lower mold 130 moves in the downward direction in the drawings, the side mold 120 may move to an outside of the pipe 1 in a lateral direction to be spaced apart from the pipe 1. More specifically, in the lower mold moving operation (S310), an inner surface of an inclined hole 120*b* may be pushed against an outer surface of an inclined bar 910 by movement of the support 131 in the first direction (Z) (downward direction on the drawings), to move in the lateral direction, which may be the second direction (X or Y).

The upper mold moving operation (S320) may be an operation of moving the upper mold 110 in the first direction (Z). For example, the upper mold 110 may move in the upward direction to be spaced apart from the pipe 1 on the drawings.

Finally, the corner core moving operation (S330) may be an operation of moving the plurality of corner cores 210 in the first direction (Z). For example, the plurality of corner cores 210 may move toward the center of the pipe 1 to be spaced apart from the pipe 1, as illustrated in the drawings. This corner core moving operation (S330) may proceed after the lower mold moving operation (S310). Specifically, after the plurality of side cores 220 rotate and move in the lower mold moving operation (S310), as illustrated in FIG. 10, a corner head 211 of each of the plurality of corner cores 210 may move in the upward direction to be separated from a head pillar 212, and may then move the plurality of corner cores 210 toward the center of the pipe 1 to be spaced apart from the pipe 1, to completely separate the pipe 1.

Based on the above-described method for manufacturing a pipe, an apparatus 1000 for manufacturing the pipe may be described in detail as follows.

Figure 7:
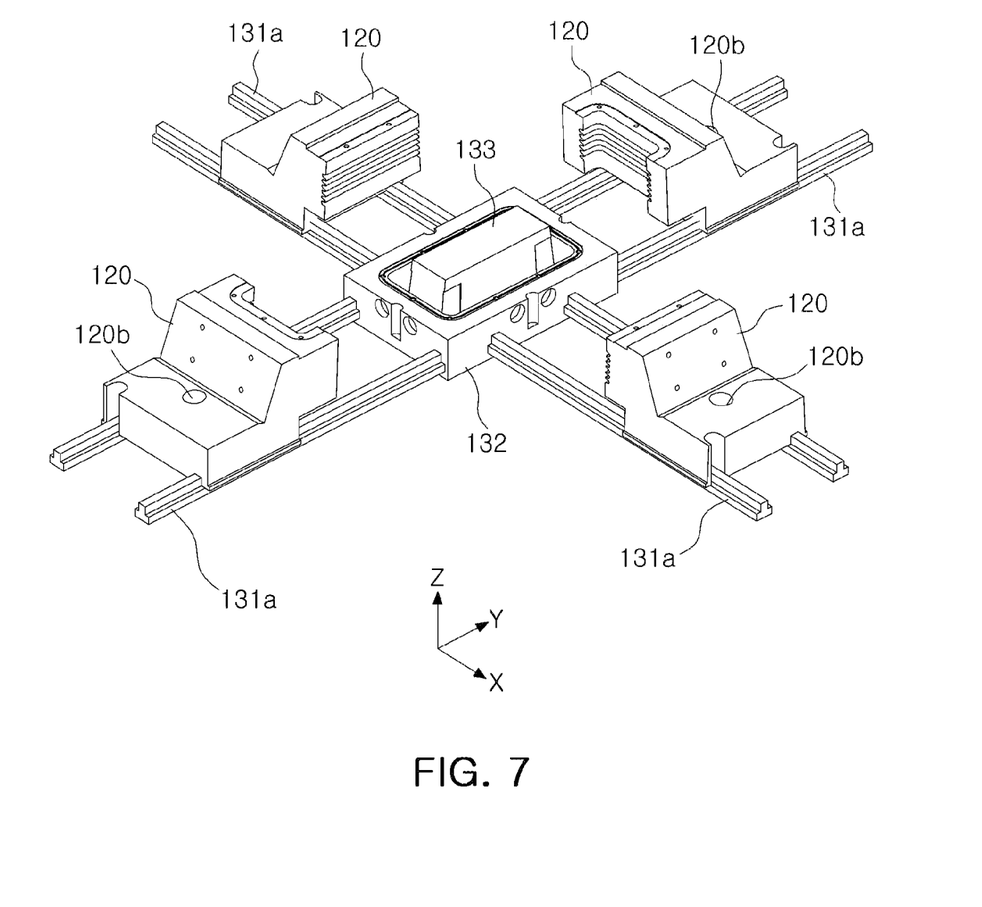
FIG. 7 is a view illustrating that the side mold of the mold portion is moved in a lateral direction in FIG. 6.
Figure 8:
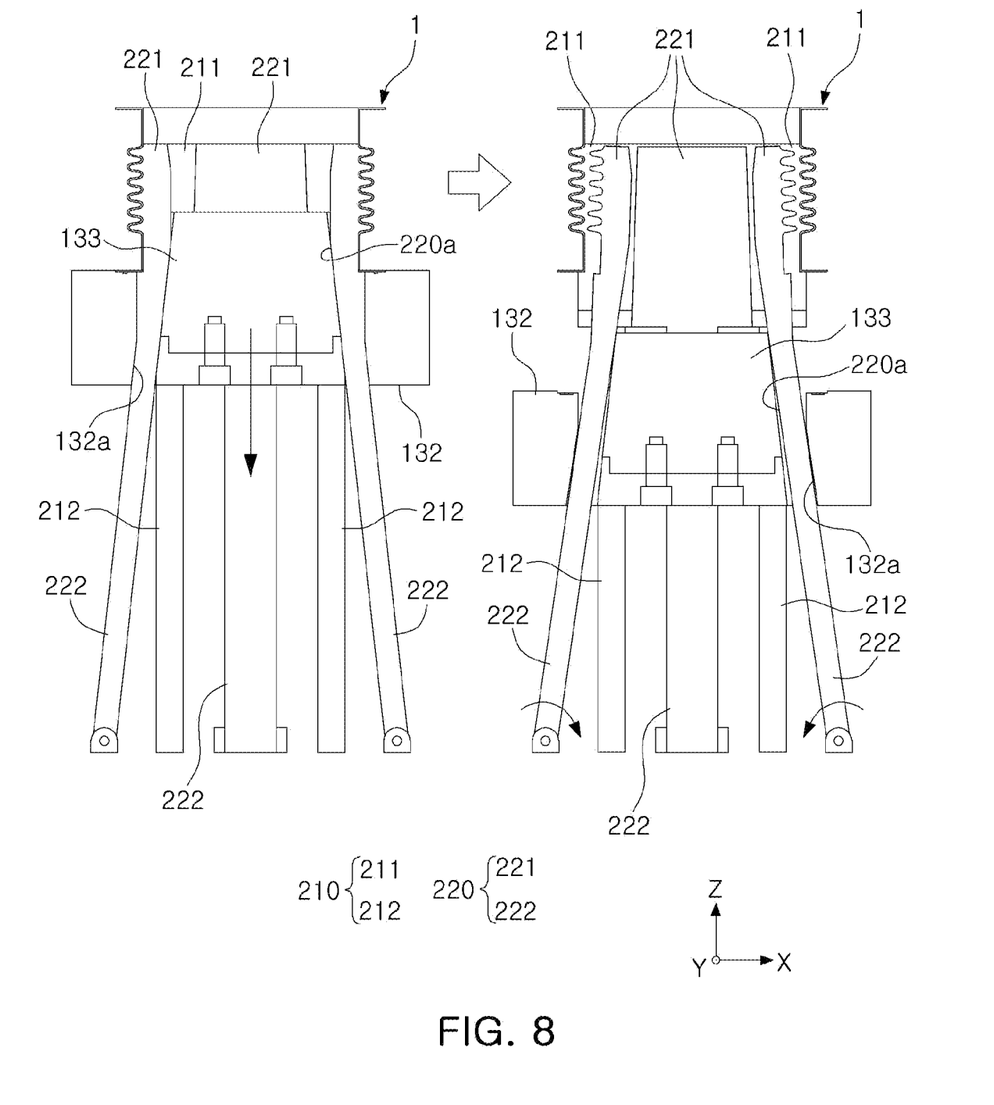
FIGS. 8 and 9 are views illustrating a process in which the side core of the core portion rotates, as the core support member of the lower mold descends, in FIG. 6.
Figure 9:
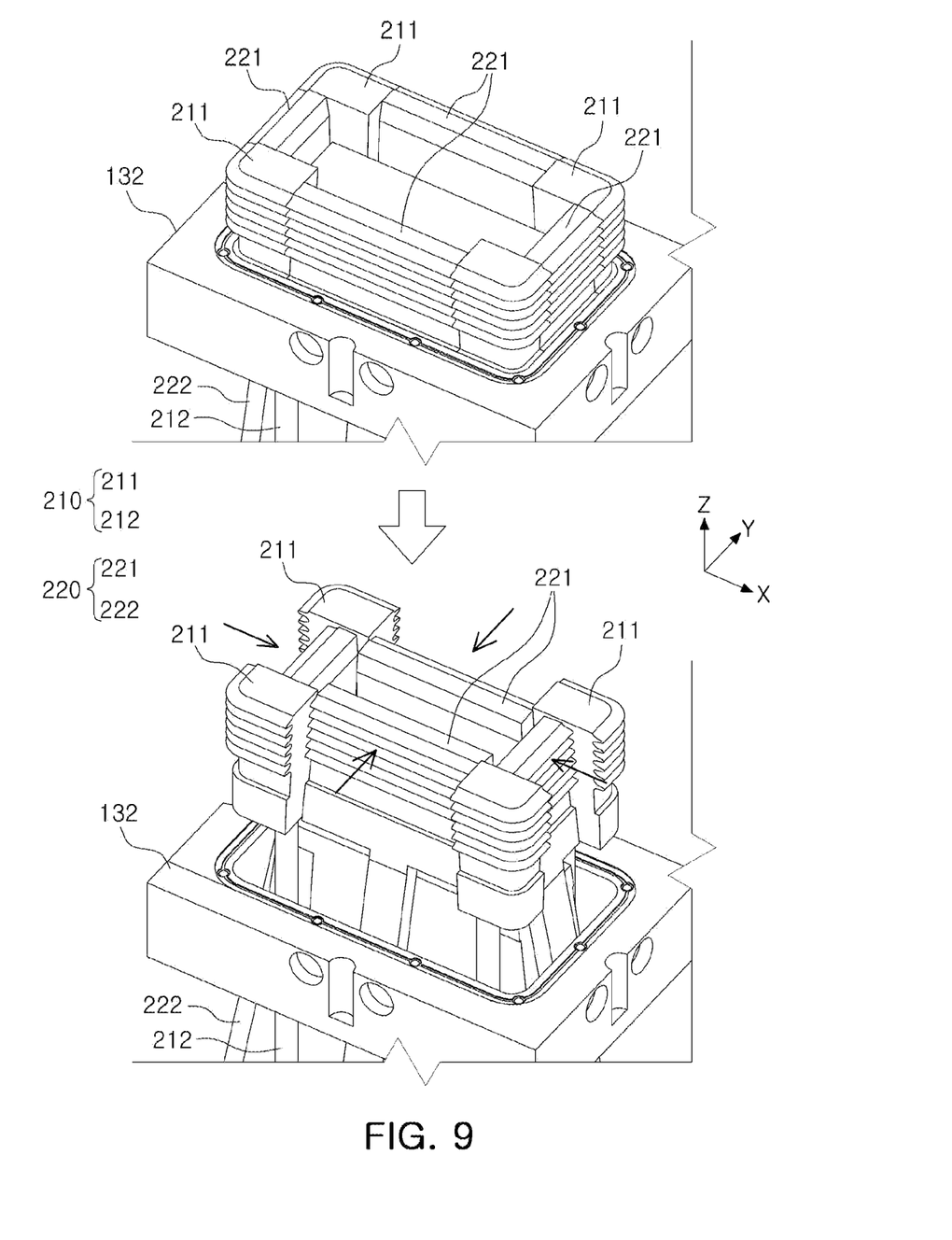
Figure 10:
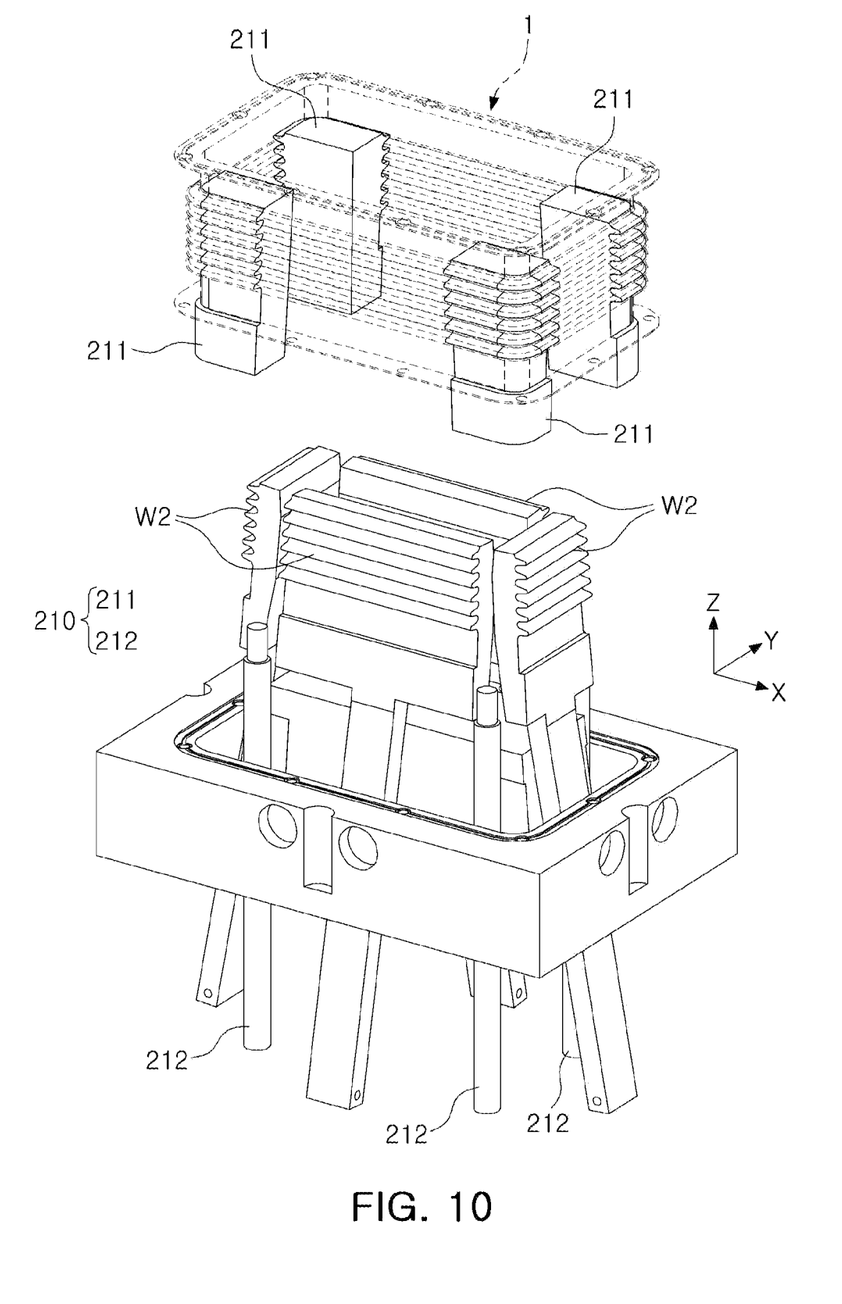
FIG. 10 is a view illustrating separation of a corner core from a core portion.

FIG. 7 is a view illustrating that the side mold of the mold portion is moved in a lateral direction in FIG. 6, FIGS. 8 and 9 are views illustrating a process in which the side core of the core portion rotates, as the core support member of the lower mold descends, in FIG. 6, and FIG. 10 is a view illustrating separation of a corner core from a core portion.

Referring to the drawings, in the lower mold 130 of the present disclosure, the side mold 120 may be movably installed, and the side core 220 may be slidably supported. The lower mold 130 may be configured to move in the first direction (Z) to move the side mold 120 and the side core 220 in the second direction (X or Y), perpendicular to the first direction (Z). For example, as the lower mold 130 moves in the downward direction, the side mold 120 and the side core 220 may move in the lateral direction in conjunction therewith.

Specifically, the present disclosure may include the base member 800, which may be spaced apart from the mold portion 100 and the core portion 200 in the first direction (Z). For example, in the drawings, the base member 800 may be spaced apart from the mold portion 100 and the core portion 200 in the downward direction.

In addition, the side core 220 may include a side head 221 and a head extension bar 222.

The side head 221 may corresponds to the inner side surface of the pipe 1, and, for example, may have the core corrugation surface W2 corresponding to a shape of the inner side surface of the pipe.

The head extension bar 222 may extend from the side head 221 in the first direction (Z), and may be hinged to the base member 800 to rotate and move in the second direction (X or Y). For example, as illustrated in the drawings, the head extension bar 222 may extend in the downward direction from the side head 221, and may be hinged to the base member 800 to rotate and move in the transverse direction.

The lower mold 130 may include the support 131, the support mold 132, and the core support member 133.

The support 131 may be movable in the first direction (Z), and the side mold 120 may be installed to be movable in the second direction (X or Y). For example, the support 131 may be configured to move in an upward or downward direction. Any conventional driving member may be used to move the support 131 in an upward or downward direction. Furthermore, the side mold 120 may be installed to be movable on the support 131 in the lateral direction.

In addition, the support mold 132 may be installed on the support 131, and a plurality of through-holes 132a may be formed. A plurality of head extension bars 222 of a plurality of side cores 220 may pass through and be disposed in the plurality of through-holes 132a. Since the head extension bar 222 may be fastened to the base member 800 and may not move in an upward or downward direction, when the through-hole 132a moves in an upward or downward direction, the head extension bar 222 may slide with respect to an inner surface of the through-hole 132a.

In addition, the core support member 133 may be installed on the support mold 132, and may support inner side surfaces 220a of the plurality of side cores 220. When the support 131 rises to rise the core support member 133 up to the side head 221 of the side core 220, the inner side surface 220a of the side core 220 may be pushed to move the side core 220 toward the side mold 120 to be spaced apart from the side mold 120 by a set gap, and in this state, and a molten material may be injected into the gap between the side core 220 and the side mold 120, to form a pipe 1 in which a corrugation is formed.

Rotational movement of the side core 220 in the second direction (X or Y) (movement toward a center of the pipe 1) by movement (downward movement) of the lower mold 130 in the first direction (Z), configured as described above, is as follows:

As a specific example, each of the plurality of through-holes 132a may have a structure inclined inwardly toward the upper mold 110. Based on this structure, when the support 131 vertically descends, the through-hole 132a of the support mold 132 may also descend vertically together. As the head extension bar 222 of the side core 220 is pushed against toward the center of the pipe 1, the side head 221 of the side core 220 rotates toward the center of the pipe 1, to be spaced apart from the pipe 1.

As another example, the side head 221 of the side core 220 may have a structure in which a portion of the side head 221 is thicker toward the upper mold 110. Based on this structure, when the support 131 vertically descends, the core support member 133 may also vertically descend together to release a pressing force of the head extension bar 222 pushing the side head 221 of the side core 220 toward the center of the pipe 1, to rotate the side head 221 of the side core 220 toward the center of the pipe 1 to be separated from the pipe 1.

Both of the above-described examples may be applied as illustrated in the drawings of the present disclosure, or only one of them may be applied to the present disclosure.

Furthermore, the core support member 133 may have a tapered structure toward the upper mold 110. When the core support member 133 is inserted between the plurality of side cores 220, the core support member 133 may be smoothly and easily inserted due to the tapered shape. For example, the core support member 133 may easily move upwardly while sliding on inner side surfaces 220a of the plurality of side cores 220.

Further, movement of the side mold 120 in the second direction (X or Y) (outward movement of the pipe 1) by movement of the lower mold 130 in the first direction (Z) (downward movement) may be as follows.

The present disclosure may include the roof member 900, the roof member 900 may move in the first direction (Z), and the upper mold 110 may be installed. For example, the roof member 900 may be configured to move in an upward or downward direction. Any conventional driving member may be used to move the roof member 900 in an upward or downward direction. Furthermore, the upper mold 110 may be installed below the roof member 900.

Specifically, a plurality of inclined bars 910 inclined outwardly toward the side mold 120 may be formed on the roof member 900.

In this case, a plurality of inclined holes 120b in which the plurality of inclined bars 910 pass through, are disposed on and are slid in the pipe 1, may be formed on the side mold 120. The plurality of inclined holes 120b may be inclined to correspond to the plurality of inclined bars 910.

With this configuration, when the lower mold 130 descends or the upper mold 110 rises, or when the lower mold 130 descends and the upper mold 110 rises, the side mold 120 may move in the second direction (X or Y), for example, to the outside of the pipe 1. In this manner, when a distance between the lower mold 130 and the upper mold 110 increases, the side mold 120 installed in the lower mold 130 may move away from the upper mold 110. In this case, movement of the side mold 120 may be implemented by an inclined hole 120b and an inclined bar 910 disposed in the inclined hole 120b. Specifically, as the support 131 of the lower mold 130 moves in the first direction (Z) (downward on the drawings) to push an inner surface of the inclined hole 120b against an outer surface of the inclined bar 910 in the second direction, to move in the lateral direction, which may be the second direction (X or Y), the side mold 120 may move in the lateral direction to be spaced apart from the pipe 1.

Furthermore, a guide rail 131a (in FIGS. 5 to 7) may be installed on the support 131, and a guide groove 120a (in FIG. 2) corresponding to the guide rail 131a may be formed in the side mold 120. As the side mold 120 slides along the guide rail 131a, the side mold 120 may move smoothly and easily in the lateral direction.

The corner core 210 may include the corner head 211 and the head pillar 212.

The corner head 211 may correspond to an inner corner of the pipe 1. The corner head 211 may correspond to an inner side surface of the pipe 1, and may have the core corrugation surface W2 corresponding to a shape of the inner side surface of the pipe 1.

The head pillar 212 may be detachably installed in the corner head 211 in the first direction (Z), and may be fixed to the base member 800. For example, in the drawings, the head pillar 212 may extend downwardly from the corner head 211, and may be connected and fixed to the base member 800.

Such a corner core 210 may be disposed between the plurality of side cores 220. After the plurality of side cores 220 rotate and move toward the center of the pipe 1, as illustrated in FIG. 10, the corner head 211 may be separated from the head pillar 212, to easily separate the corner head 211 from the pipe 1. Furthermore, to manufacture the pipe 1 again, the corner head 211 may be reassembled to the head pillar 212.

As a result, since the present disclosure may be configured that a lower mold 130 moves in the first direction (Z) to rotate and move a side mold 120 in the second direction (X or Y), perpendicular to the first direction (Z), and move a side core 220 in the second direction (X or Y), a working time period in removing a manufactured pipe 1 may be shortened and the take-out work may be carried smoothly and easily out, to increase productivity.

The present disclosure may be configured to move a lower mold in a first direction, rotate and move a side mold in a second direction, perpendicular to the first direction, and move a side core in the second direction, to have effects of shortening a working time period in removing a manufactured pipe, and carrying out the take-out work smoothly and easily, to increase productivity.

While example embodiments have been illustrated and described above, it will be apparent to those skilled in the art that modifications and variations could be made without departing from the scope of the present disclosure as defined by the appended claims.

What is claimed is:

1. An apparatus for manufacturing a pipe, comprising: a mold portion having an inner surface corresponding to an outer shape of the pipe, a core portion having an outer surface corresponding to an inner shape of the pipe, and a base member spaced apart from the mold portion and the core portion in a first direction, wherein the mold portion includes an upper mold, a plurality of side molds, and a lower mold, the core portion includes a plurality of corner cores corresponding to inner corners of the pipe, and a plurality of side cores disposed between the plurality of corner cores and corresponding to inner side surfaces of the pipe, wherein each of the plurality of side cores includes a side head corresponding to one of the inner side surfaces of the pipe, and a head extension bar extending from the side head in the first direction and hinged to the base member to rotate and move in a second direction, and wherein the lower mold comprises a support configured to move in the first direction and move the plurality of side molds and the plurality of side cores in the second direction, perpendicular to the first direction, a support mold installed on the support, and having a plurality of through holes through which a plurality of the head extension bars of the plurality of side cores pass and slide, and a core support member installed on the support mold and supporting inner side surfaces of the plurality of side cores.

2. The apparatus of claim 1, wherein the plurality of through-holes are formed to be inclined inwardly toward the upper mold.

3. The apparatus of claim 1, wherein the side head of each of the plurality of side cores is formed to be thicker toward the upper mold.

4. The apparatus of claim 1, wherein the core support member is formed to be tapered toward the upper mold.

5. The apparatus of claim 1, wherein a guide rail is installed on the support, and a guide groove corresponding to the guide rail is formed on each of the plurality of side molds to slide each of the plurality of side molds along the guide rail.

6. An apparatus for manufacturing a pipe, comprising; a mold portion having an inner surface corresponding to an outer shape of the pipe, a core portion having an outer surface corresponding to an inner shape of the pipe, a base member spaced apart from the mold portion and the core portion in a first direction, and a roof member moving in the first direction and having the upper mold installed thereon, wherein the mold portion includes an upper mold, a plurality of side molds, and a lower mold, the core portion includes a plurality of corner cores corresponding to inner corners of the pipe, and a plurality of side cores disposed between the plurality of corner cores and corresponding to inner side surfaces of the pipe, wherein each of the plurality of side cores includes a side head corresponding to one of the inner side surfaces of the pipe, and a head extension bar extending from the side head in the first direction and hinged to the base member to rotate and move in a second direction, wherein the lower mold comprises a support configured to move in the first direction and move the plurality of side molds and the plurality of side cores in the second direction, perpendicular to the first direction, wherein a plurality of inclined bars inclined outwardly toward the plurality of side molds are formed on the roof member, a plurality of inclined holes through which the plurality of inclined bars pass and slide, are formed on each of the plurality of side molds, and the plurality of inclined holes are formed to be inclined to correspond to the plurality of inclined bars.

7. The apparatus of claim 1, wherein each of the plurality of corner cores comprises:
   a corner head corresponding to one of the inner corners of the pipe; and
   a head pillar detachably installed on the corner head in the first direction and fixed to the base member.

8. The apparatus of claim 1, wherein a mold corrugation surface is formed on the plurality of side molds to correspond to a corrugation of the pipe, and a core corrugation surface is formed on the plurality of corner cores and the plurality of side cores, respectively.

9. An apparatus for manufacturing a pipe, comprising:
   an upper mold, a side mold, and a lower mold, having an inner surface corresponding to an outer shape of the pipe, a plurality of corner cores corresponding to inner corners of the pipe, a plurality of side cores disposed between the plurality of corner cores and corresponding to inner side surfaces of the pipe, and a base member spaced apart from the lower mold in a first direction,
   wherein each of the plurality of side cores includes a side head corresponding to one of the inner side surfaces of the pipe, and a head extension bar extending from the side head in the first direction and hinged to the base member, the lower mold includes a support installed to move in the first direction and to move the side mold in a second direction, perpendicular to the first direction, a support mold installed on the support, and having a plurality of through-holes through which a plurality of the head extension bar of the plurality of side cores pass and slide, and a core support member installed on the support mold and slidably supporting inner side surfaces of the plurality of side cores, wherein the plurality of through-holes are formed to be inclined inwardly toward the upper mold, and a portion of the side head of the side core is formed to be thicker toward the upper mold.

10. The apparatus of claim 9, wherein the core support member is formed to be tapered toward the upper mold.

11. The apparatus of claim 9, wherein a guide rail is installed on the support, and a guide groove corresponding to the guide rail is formed on the side mold to slide the side mold along the guide rail.

12. The apparatus of claim 9, further comprising a roof member moving in the first direction and having the upper mold installed thereon, wherein a plurality of inclined bars inclined outwardly toward the side mold are formed on the roof member, a plurality of inclined holes through which the plurality of inclined bars pass and slide, are formed on the side mold, and the plurality of inclined holes are formed to be inclined to correspond to the plurality of inclined bars.

13. The apparatus of claim 9, wherein each of the plurality of corner cores comprises:

a corner head corresponding to one of the inner corners of the pipe; and a head pillar detachably installed on the corner head in the first direction and fixed to the base member.

14. The apparatus of claim 9, wherein a mold corrugation surface is formed on the side mold to correspond to a corrugation of the pipe, and a core corrugation surface is formed on the plurality of corner cores and the plurality of side cores, respectively.

* * * * *